(12) United States Patent
Nakamura et al.

(10) Patent No.: US 6,692,658 B2
(45) Date of Patent: Feb. 17, 2004

(54) ELECTROLYTE AND SECONDARY CELL

(75) Inventors: Shinichi Nakamura, Isehara (JP); Satoshi Igawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 09/736,437

(22) Filed: Dec. 15, 2000

(65) Prior Publication Data

US 2002/0017632 A1 Feb. 14, 2002

(30) Foreign Application Priority Data

Dec. 17, 1999 (JP) .......................................... 11-358291

(51) Int. Cl.$^7$ ............................................... C09K 19/12
(52) U.S. Cl. ............................. 252/299.65; 252/299.6; 252/299.01; 252/299.67; 252/299.7; 252/299.3
(58) Field of Search .................. 252/299.01, 299.7, 252/62.2, 299.6, 299.63, 299.64, 299.65, 299.66, 299.67, 299.3; 429/122, 188, 301, 303, 304, 306, 307–309, 321, 322, 324; 29/33, 46

(56) References Cited

U.S. PATENT DOCUMENTS

| | | | | |
|---|---|---|---|---|
| 5,354,499 A | * | 10/1994 | Elliot ....................... | 252/299.5 |
| 5,631,765 A | * | 5/1997 | Baur et al. .................. | 359/274 |
| 5,683,833 A | * | 11/1997 | Haussling et al. ........... | 429/192 |
| 5,888,666 A | * | 3/1999 | Kawakami ................... | 429/62 |
| 6,171,522 B1 | * | 1/2001 | Michot et al. .............. | 252/500 |
| 6,464,904 B1 | * | 10/2002 | Hirose et al. ............... | 252/622 |

OTHER PUBLICATIONS

H. Akashi, et al., "Ionic Conduction and Dielectric Relaxation of Ionic Conductive Polymer, Poly[2–(2–methoxyethoxy)ethyl Glycidyl Ether] (PMEEGE), Utilizing Side Chain Relaxation," Japan, vol. 40, No. 10 (1991), 3766–3768. (with English–language translation).

S. Chandrasekhar, et al., "Discotic liquid crystals," Rep. Prog. Phys. 53 (1990), 57–84.

S. Takenaka, "Design and Synthesis of Discotic Molecules," Quarterly Chemistry Outlines, vol. 22, 60–72.

M. Watanabe, et al., "Estimation Li+ Transport Nubmer in Polymer Electrolytes by the Combination of Complex Impedance and Potentiostatic Polarization Measurements", Solid State Ionics, vols. 28–30, pp. 911–917 (1988).

S. Chandrasekhar, et al., "Liquid Crystals of Disc–Like Molecules", Pramana, vol. 9, No. 5, pp. 471–480 (1977).

K. Ito, et al., "Polyether/Salt Hybrid (IV). Effect of Benzenesulfonate Group(s) and PEO Molecular Weight on the Bulk Ionic Conductivity", Electrochimica Acta, vol. 42, No. 10, pp. 1561–1570 (1997).

J. Lehn, et al., "Tubular Mesophases: Liquid Crystals Consisting of Macrocyclic Molecules", J. Chem. Soc., Chem. Commun., No. 24, pp. 1794–1796 (1985).

C. Piechocki, et al., "Discotic Mesophases Obtained from Substituted Metallophthalocynines. Toward Liquid Crystalline One–Dimensional Conductors", J. Am. Chem. Soc., vol. 104, pp. 5245–5247 (1982).

* cited by examiner

Primary Examiner—Mark F. Huff
Assistant Examiner—Jennifer R. Sadulo
(74) Attorney, Agent, or Firm—Fitzpatrick, Cella, Harper & Scinto (57) ABSTRACT

An electrolyte comprises a liquid-crystal compound, a straight-chain or branched polyether compound and a metal salt.

10 Claims, 1 Drawing Sheet

ELECTROLYTE AND SECONDARY CELL

BACKGROUND OF THE INVENTION

1. Field of the Invention

This invention relates to a novel electrolyte used in the field of electronics, such as cell devices, photochromic devices and sensor devices, and a secondary cell (storage cell) making use of such an electrolyte.

2. Related Background Art

In 1973, Wright et al. reported ion conductivity of a complex of polyethylene oxide (PEO) with an alkali metal salt and, in 1979, Armand et al. demonstrated a possibility of an electrolyte used in cells. This has brought about a world-wide spread of researches on solid electrolytes. Solid electrolytes are not liquid in form, and hence, as being free from any leakage to the outside, they are advantageous over liquid electrolytes in respect of heat resistance, reliability, safety, and device miniaturization. Also, organic matter is softer than inorganic matter, and hence has an advantage that it can be worked with ease. In general, the ion conductivity of electrolytes is expressed as the product of carrier density and electric-charge or ion mobility, and hence electrolytes are required to have a high polarity for dissociating ions and a low viscosity for migrating ions dissociated. From this point of view, PEO can not be said to have sufficient properties as a solid electrolyte. First of all, the ion transport mechanism of PEO is based on the ligand exchange in which ions dissociated as a result of coordination to donative polar-group moieties are delivered one after another on account of segment movement caused by heat. Hence, the PEO tends to have temperature dependence. Also, dissolution of metal ions in a large quantity for the purpose of enhancing carrier density may cause crystallization to lower ionic mobility conversely. In order to prevent this crystallization, development has been made on a PEO formed by urethane cross-linking (M. Watanabe et al., Solid State Ionics, 28–30, 911, 1988) and also on a PEO to the cross-linked moieties of which side chains have been introduced in order to improve ionic mobility (The 40th Polymer Forum Draft Collections, 3766, 1991). Recently, development has also been made on a molten salt type PEO to a terminal of which a salt has been introduced (K. Ito et al., Solid-State Ionics, 86–88, 325, 1996, and K. Ito et al., Electrochim. Acta, 42, 1561, 1997). However, since any sufficient ion conductivity has not yet been attained under existing circumstances, prevalent are electrolytic solutions formed of a mixture of a solvent having a high dielectric constant and a solvent having a low viscosity, or gel electrolytes formed of an electrolytic solution immobilized with an organic polymer. Also, when solid electrolytes are used as cell devices, not only the efficiency of ion transport but also the efficiency of electrochemical reaction at surfaces in contact with electrodes have come into question.

Meanwhile, discotic liquid-crystal phases are liquid-crystal phases discovered by S. Chandrasekhar et al. in 1977 (Pramana 9, 471, 1977). For example, as explained by the same authors in Rep. Prog. Phs. 53 (1990) 57, entitled "Discotic Liquid Crystals", and by Shunsuke Takenaka in Quarterly Chemistry Outlines Vol. 22, page 60, The Chemical Society of Japan, entitled "Design And Synthesis of Discotic Liquid Crystals", such phases are seen in compounds in which a plurality of relatively long side chains are linked with disk-like cores. The type of such compounds can be classified chiefly by structure of the cores, and may include derivatives of hexa-substituted benzene and tri-substituted benzene, derivatives of phthalocyanine and porphyrin, derivatives of triphenylene, truxene and pyrylium, tribenzocyclonene derivatives, azacrown derivatives, and cyclohexane derivatives. On account of structural features of discotic liquid crystals, some reports are made which suggest their application to devices, as exemplified by application of electron (or hole) channels in systems having conjugated pi electrons, such as phthalocyanine and triphenylene (Piechocki et al., J. Am. Chem. Soc., 1982, 104, p.5245), and, in the case of cyclic ones whose cores are formed of azacrown, application of molecular channels in which molecules pass selectively through gaps at the centers (J. Chem. Soc., Chem. Commun., 1985, 1794, and J. Chem. Soc., Chem. Commun., 1995, 117, 9957).

Recently, Kato et al. make a report also on electrolytes having a smectic liquid-crystal phase (1998 Japan Liquid-Crystal Association Lecture Draft Collections, 3B08). Also, Japanese Patent Application Laid-Open No. 11-86629 discloses an ion-conductive material that utilizes orientation properties of liquid crystal. There, however, is no disclosure as to use of a mixture of a liquid-crystal compound, a straight-chain or branched polyether compound and a metal salt.

SUMMARY OF THE INVENTION

The present invention was made taking account of such conventional techniques. Accordingly, an object of the present invention is to provide an electrolyte having anisotropy in ion conductivity, containing a liquid-crystal compound, a straight-chain or branched polyether compound and a metal salt.

Another object of the present invention is to provide a secondary cell making use of such an electrolyte.

The present invention provides an electrolyte comprising a liquid-crystal compound, a straight-chain or branched polyether compound and a metal salt.

The liquid-crystal compound may preferably be a discotic liquid-crystal compound.

The liquid-crystal compound may also preferably be a liquid-crystal compound having at least a smectic phase.

The liquid-crystal compound may still also preferably have been made polymeric by polymerization reaction.

The metal salt may preferably be an alkali metal salt.

The electrolyte may preferably contain an organic solvent.

The present invention also provides a secondary cell comprising the electrolyte described above.

According to the present invention, an electrolyte having anisotropy in ion conductivity can be provided for electrolytes used in the field of electronics, such as cells and sensor devices.

According to the present invention, a secondary cell can be provided which make use of the above electrolyte having anisotropy in ion conductivity.

DESCRIPTION OF THE PREFERRED EMBODIMENTS

The present invention is an electrolyte comprising a liquid-crystal compound, a straight-chain or branched polyether compound and a metal salt.

The present invention is also a secondary cell making use of the electrolyte of the present invention.

As the liquid-crystal compound, usable are nematic liquid-crystal compounds (as typified by rod-like liquid crystals), smectic liquid-crystal compounds and discotic liquid-crystal compounds, and discotic liquid-crystal compounds having a columnar phase are preferred. These liquid-crystal compounds may also preferably be those having been made polymeric by polymerization. For such polymerization, preferred are a method in which a liquid-crystal compound having a side chain to the terminal of which a polymerizable group such as an acrylic group, a methacrylic group, an epoxy group or a vinyl group has been attached is polymerized, and a method in which such a compound is copolymerized with an additional polymerizable compound. The additional polymerizable compound may include, but not particularly limited to, acrylic acid derivatives, methacrylic acid derivatives, vinyl derivatives, styrene derivatives, urethane derivatives and epoxy derivatives.

The liquid-crystal compound contained in the electrolyte of the present invention may usually be in a content of from 50 to 99% by weight, and preferably from 70 to 95% by weight. Its use in a content less than 50% by weight may make it difficult to maintain liquid-crystal properties, and use in a content more than 99% by weight may cause a lowering of ion conductivity, undesirably.

The straight-chain or branched polyether compound may include polyethylene oxide, polypropylene oxide, and copolymers of these. Those having an average molecular weight of from 200 to 6,000 are preferred.

The straight-chain or branched polyether compound contained in the electrolyte of the present invention may usually be in a content of from 1 to 50% by weight, and preferably from 5 to 30% by weight. Its use in a content less than 1% by weight may cause a lowering of ion conductivity, and use in a content more than 50% by weight may make it difficult to maintain liquid-crystal properties, undesirably.

The metal salt may preferably include alkali metal salts such as $MClO_4$, $MBF_4$, $MPF_6$, $MCF_3SO_2$ and $M(CF_3SO_2)_2N$ (M represents Li, Na or K), and besides metal salts such as $CuSO_4$, $Ni(NO_3)_2$ and $Ni(BF_4)_2$. Particularly preferred are lithium metal salts such as $LiClO_4$, $LiBF_4$, $LiPF_6$, $LiCF_3SO_2$ and $Li(CF_3SO_2)_2N$. The metal salt contained in the electrolyte of the present invention may usually be in a content of from 0.01 to 50% by weight, and preferably from 0.1 to 30% by weight.

The electrolyte of the present invention may also contain an organic solvent, which may preferably be a polar organic solvent, as exemplified by ethylene carbonate, propylene carbonate, γ-butyrolactone, tetrahydrofuran, dioxane, methyl ethyl ketone, methyl propionate, dimethoxyethane, and glycols.

In the present invention, the combination of the polyether compound with the liquid-crystal compound imparts anisotropy to the conduction of ions. Without limitations thereto, variations of combination are possible in many ways, making it easy to regulate electrolyte properties such as glass transition temperature (Tg), viscosity and temperature dependence of ion conductivity of the electrolyte.

As detailed below, the straight-chain or branched polyether compound used in the electrolyte of the present invention may preferably be those having a specific structure represented by any of the following formulas (a) to (d), but the present invention is by no means limited only to these.

(a)

(b)

(c)

(d)

In the formulas, n is an integer of 5 to 100, and preferably 5 to 50; m is an integer of 1 to 50, and preferably 1 to 10; and x represents a number of 0.1 to 0.9.

The liquid-crystal compound used in the present invention may preferably be a compound represented by the following general formula (I) or (II).

(I)

In the general formula (I), $R_1$, $R_2$, $R_3$, $R_4$, $R_5$ and $R_6$ each independently represents a side chain which is constituted of at least two $OCH_2CH_2$ segments or $OCH_2CH_2CH_2$ segments and to the terminal of which a straight-chain or branched alkyl group has been attached, provided that the hydrogen atom in the alkyl group may be substituted with a fluorine atom and at least one methylene group may be substituted with O, CO, —CH=CH—, —C≡C— or an epoxy group.

In the above general formula (I), $R_1$, $R_2$, $R_3$, $R_4$, $R_5$ and $R_6$ may each independently preferably be $(OCH_2CH_2)_nOR_7$ or $(OCH_2CH_2CH_2)_nOR_7$. In these formulas, n is an integer of 1 to 20, and $R_7$ represents a straight-chain or branched alkyl group having 4 to 20 carbon atoms. The hydrogen atom in the alkyl group may be substituted with a fluorine atom and at least one methylene group may be substituted with O, CO, —CH=CH—, —C≡C— or an epoxy group.

(II)

In the general formula (II), A represents A1-B1-A2-B2-A3-B3-A4-B4-A5-B5-A6. A1, A2 and A3 each represent 1,4-phenylene (at least one CH may be substituted with CF or N) or 1,4-cyclohexylene. A4, A5 and A6 each represent 1,4-phenylene (at least one CH may be substituted with CF or N) or 1,4-cyclohexylene. B1, B2, B3, B4 and B5 each represent a single bond, —$CH_2O$—, —$OCH_2$—,—COO— or —OOC—. X represents —$CH_2CH_2O$— or —$CHCH_3CH_2O$, and Y represents —$OCH_2CH_2$— or —$OCH_2CHCH_3$—. $R_{11}$ and $R_{12}$ each independently represent a straight-chain or branched alkyl group having 1 to 100 carbon atoms, and at least one methylene in the alkyl group may be substituted with O, CO, S, —CH=CH— or —C≡C—. Also, the hydrogen atom in the alkyl group may be substituted with a fluorine atom. Symbols m1 and n1 each represent an integer of 3 to 25.

In the general formula (II), the substituent A of the compound may preferably be any of compounds represented by the following general formulas IIa to IIi. In the following, z's are each independently an integer of 0 to 4.

Specific structures of the liquid-crystal compound used in the electrolyte of the present invention are shown below in Tables 1 and 2 as exemplary compounds, but the present invention is by no means limited only to these. In the following, code addresses representing the substituent A in Table 2 indicate the following groups.

(IIIi)

(IVa)     (IVb)

TABLE 1

$R_1$ to $R_6$ are the same and each represent:

| No. | |
|---|---|
| T-1 | $OCH_2CH_2OCH_3$ |
| T-2 | $OCH_2CH_2OC_2H_5$ |
| T-3 | $OCH_2CH_2OC_3H_7$ |
| T-4 | $OCH_2CH_2OC_4H_9$ |
| T-5 | $OCH_2CH_2OC_5H_{11}$ |
| T-6 | $OCH_2CH_2OC_6H_{13}$ |
| T-7 | $OCH_2CH_2OC_7H_{15}$ |
| T-8 | $OCH_2CH_2OC_8H_{17}$ |
| T-9 | $OCH_2CH_2OC_9H_{19}$ |
| T-10 | $OCH_2CH_2OC_{10}H_{21}$ |
| T-11 | $O(CH_2CH_2O)_2CH_3$ |
| T-12 | $O(CH_2CH_2O)_2C_2H_5$ |
| T-13 | $O(CH_2CH_2O)_2C_3H_7$ |
| T-14 | $O(CH_2CH_2O)_2C_4H_9$ |
| T-15 | $O(CH_2CH_2O)_2C_5H_{11}$ |
| T-16 | $O(CH_2CH_2O)_2C_6H_{13}$ |
| T-17 | $O(CH_2CH_2O)_2C_7H_{15}$ |

TABLE 1-continued $R_1$ to $R_6$ are the same and each represent:

| No. | |
|---|---|
| T-18 | $O(CH_2CH_2O)_2C_8H_{17}$ |
| T-19 | $O(CH_2CH_2O)_2C_9H_{19}$ |
| T-20 | $O(CH_2CH_2O)_2C_{10}H_{21}$ |
| T-21 | $O(CH_2CH_2O)_3CH_3$ |
| T-22 | $O(CH_2CH_2O)_3C_2H_5$ |
| T-23 | $O(CH_2CH_2O)_3C_3H_7$ |
| T-24 | $O(CH_2CH_2O)_3C_4H_9$ |
| T-25 | $O(CH_2CH_2O)_3C_5H_{11}$ |
| T-26 | $O(CH_2CH_2O)_3C_6H_{13}$ |
| T-27 | $O(CH_2CH_2O)_3C_7H_{15}$ |
| T-28 | $O(CH_2CH_2O)_3C_8H_{17}$ |
| T-29 | $O(CH_2CH_2O)_3C_9H_{19}$ |
| T-30 | $O(CH_2CH_2O)_3C_{10}H_{21}$ |

TABLE 2

$R_{11}-X_{m1}-A-Y_{n1}-R_{12}$

| No. | A | $R_{11}$ | $R_{12}$ | X | Y | m1 | n1 |
|---|---|---|---|---|---|---|---|
| S-1 | IIIa | $CH_3O$ | $OCH_3$ | $CH_2CH_2O$ | $OCH_2CH_2$ | 3 | 3 |
| S-2 | IIIa | $CH_3O$ | $OCH_3$ | $CH_2CH_2O$ | $OCH_2CH_2$ | 3 | 4 |
| S-3 | IIIa | $CH_3O$ | $OCH_3$ | $CH_2CH_2O$ | $OCH_2CH_2$ | 3 | 5 |
| S-4 | IIIa | $CH_3O$ | $OCH_3$ | $CH_2CH_2O$ | $OCH_2CH_2$ | 3 | 6 |
| S-5 | IIIa | $CH_3O$ | $OCH_3$ | $CH_2CH_2O$ | $OCH_2CH_2$ | 3 | 7 |
| S-6 | IIIa | $CH_3O$ | $OCH_3$ | $CH_2CH_2O$ | $OCH_2CH_2$ | 3 | 8 |
| S-7 | IIIa | $CH_3O$ | $OCH_3$ | $CH_2CH_2O$ | $OCH_2CH_2$ | 3 | 10 |
| S-8 | IIIa | $CH_3O$ | $OCH_3$ | $CH_2CH_2O$ | $OCH_2CH_2$ | 3 | 16 |

TABLE 2-continued $R_{11}-X_{m1}-A-Y_{n1}-R_{12}$

| No. | A | $R_{11}$ | $R_{12}$ | X | Y | m1 | n1 |
|---|---|---|---|---|---|---|---|
| S-9 | IIIa | CH$_3$O | OCH$_3$ | CH$_2$CH$_2$O | OCH$_2$CH$_2$ | 3 | 22 |
| S-10 | IIIa | CH$_3$O | OCH$_3$ | CH$_2$CH$_2$O | OCH$_2$CH$_2$ | 4 | 3 |
| S-11 | IIIa | CH$_3$O | OCH$_3$ | CH$_2$CH$_2$O | OCH$_2$CH$_2$ | 4 | 4 |
| S-12 | IIIa | CH$_3$O | OCH$_3$ | CH$_2$CH$_2$O | OCH$_2$CH$_2$ | 4 | 5 |
| S-13 | IIIa | CH$_3$O | OCH$_3$ | CH$_2$CH$_2$O | OCH$_2$CH$_2$ | 4 | 6 |
| S-14 | IIIa | CH$_3$O | OCH$_3$ | CH$_2$CH$_2$O | OCH$_2$CH$_2$ | 4 | 7 |
| S-15 | IIIa | CH$_3$O | OCH$_3$ | CH$_2$CH$_2$O | OCH$_2$CH$_2$ | 4 | 8 |
| S-16 | IIIa | CH$_3$O | OCH$_3$ | CH$_2$CH$_2$O | OCH$_2$CH$_2$ | 4 | 11 |
| S-17 | IIIa | CH$_3$O | OCH$_3$ | CH$_2$CH$_2$O | OCH$_2$CH$_2$ | 4 | 17 |
| S-18 | IIIa | CH$_3$O | OCH$_3$ | CH$_2$CH$_2$O | OCH$_2$CH$_2$ | 4 | 23 |
| S-19 | IIIa | CH$_3$O | OCH$_3$ | CH$_2$CH$_2$O | OCH$_2$CH$_2$ | 5 | 3 |
| S-20 | IIIa | CH$_3$O | OCH$_3$ | CH$_2$CH$_2$O | OCH$_2$CH$_2$ | 5 | 4 |
| S-21 | IIIa | CH$_3$O | OCH$_3$ | CH$_2$CH$_2$O | OCH$_2$CH$_2$ | 5 | 5 |
| S-22 | IIIa | CH$_3$O | OCH$_3$ | CH$_2$CH$_2$O | OCH$_2$CH$_2$ | 5 | 6 |
| S-23 | IIIa | CH$_3$O | OCH$_3$ | CH$_2$CH$_2$O | OCH$_2$CH$_2$ | 5 | 7 |
| S-24 | IIIa | CH$_3$O | OCH$_3$ | CH$_2$CH$_2$O | OCH$_2$CH$_2$ | 5 | 8 |
| S-25 | IIIa | CH$_3$O | OCH$_3$ | CH$_2$CH$_2$O | OCH$_2$CH$_2$ | 5 | 12 |
| S-26 | IIIa | CH$_3$O | OCH$_3$ | CH$_2$CH$_2$O | OCH$_2$CH$_2$ | 5 | 18 |
| S-27 | IIIa | CH$_3$O | OCH$_3$ | CH$_2$CH$_2$O | OCH$_2$CH$_2$ | 5 | 24 |
| S-28 | IIIa | CH$_3$O | OCH$_3$ | CH$_2$CH$_2$O | OCH$_2$CH$_2$ | 6 | 3 |
| S-29 | IIIa | CH$_3$O | OCH$_3$ | CH$_2$CH$_2$O | OCH$_2$CH$_2$ | 6 | 4 |
| S-30 | IIIa | CH$_3$O | OCH$_3$ | CH$_2$CH$_2$O | OCH$_2$CH$_2$ | 6 | 5 |
| S-31 | IIIa | CH$_3$O | OCH$_3$ | CH$_2$CH$_2$O | OCH$_2$CH$_2$ | 6 | 6 |
| S-32 | IIIa | CH$_3$O | OCH$_3$ | CH$_2$CH$_2$O | OCH$_2$CH$_2$ | 6 | 7 |
| S-33 | IIIa | CH$_3$O | OCH$_3$ | CH$_2$CH$_2$O | OCH$_2$CH$_2$ | 6 | 8 |
| S-34 | IIIa | CH$_3$O | OCH$_3$ | CH$_2$CH$_2$O | OCH$_2$CH$_2$ | 6 | 13 |
| S-35 | IIIa | CH$_3$O | OCH$_3$ | CH$_2$CH$_2$O | OCH$_2$CH$_2$ | 6 | 19 |
| S-36 | IIIa | CH$_3$O | OCH$_3$ | CH$_2$CH$_2$O | OCH$_2$CH$_2$ | 6 | 25 |
| S-37 | IIIa | CH$_3$O | OCH$_3$ | CH$_2$CH$_2$O | OCH$_2$CH$_2$ | 7 | 3 |
| S-38 | IIIa | CH$_3$O | OCH$_3$ | CH$_2$CH$_2$O | OCH$_2$CH$_2$ | 7 | 4 |
| S-39 | IIIa | CH$_3$O | OCH$_3$ | CH$_2$CH$_2$O | OCH$_2$CH$_2$ | 7 | 5 |
| S-40 | IIIa | CH$_3$O | OCH$_3$ | CH$_2$CH$_2$O | OCH$_2$CH$_2$ | 7 | 6 |
| S-41 | IIIa | CH$_3$O | OCH$_3$ | CH$_2$CH$_2$O | OCH$_2$CH$_2$ | 7 | 7 |
| S-42 | IIIa | CH$_3$O | OCH$_3$ | CH$_2$CH$_2$O | OCH$_2$CH$_2$ | 7 | 8 |
| S-43 | IIIa | CH$_3$O | OCH$_3$ | CH$_2$CH$_2$O | OCH$_2$CH$_2$ | 7 | 14 |
| S-44 | IIIa | CH$_3$O | OCH$_3$ | CH$_2$CH$_2$O | OCH$_2$CH$_2$ | 7 | 20 |
| S-45 | IIIa | CH$_3$O | OCH$_3$ | CH$_2$CH$_2$O | OCH$_2$CH$_2$ | 8 | 3 |
| S-46 | IIIa | CH$_3$O | OCH$_3$ | CH$_2$CH$_2$O | OCH$_2$CH$_2$ | 8 | 4 |
| S-47 | IIIa | CH$_3$O | OCH$_3$ | CH$_2$CH$_2$O | OCH$_2$CH$_2$ | 8 | 5 |
| S-48 | IIIa | CH$_3$O | OCH$_3$ | CH$_2$CH$_2$O | OCH$_2$CH$_2$ | 8 | 6 |
| S-49 | IIIa | CH$_3$O | OCH$_3$ | CH$_2$CH$_2$O | OCH$_2$CH$_2$ | 8 | 7 |
| S-50 | IIIa | CH$_3$O | OCH$_3$ | CH$_2$CH$_2$O | OCH$_2$CH$_2$ | 8 | 8 |
| S-51 | IIIa | CH$_3$O | OCH$_3$ | CH$_2$CH$_2$O | OCH$_2$CH$_2$ | 8 | 9 |
| S-52 | IIIa | CH$_3$O | OCH$_3$ | CH$_2$CH$_2$O | OCH$_2$CH$_2$ | 8 | 15 |
| S-53 | IIIa | CH$_3$O | OCH$_3$ | CH$_2$CH$_2$O | OCH$_2$CH$_2$ | 8 | 21 |
| S-54 | IIIa | CH$_3$O | OCH$_3$ | CH$_2$CH$_2$O | OCH$_2$CH$_2$ | 9 | 9 |
| S-55 | IIIa | CH$_3$O | OCH$_3$ | CH$_2$CH$_2$O | OCH$_2$CH$_2$ | 10 | 10 |
| S-56 | IIIa | CH$_3$O | OCH$_3$ | CH$_2$CH$_2$O | OCH$_2$CH$_2$ | 11 | 11 |
| S-57 | IIIa | CH$_3$O | OCH$_3$ | CH$_2$CH$_2$O | OCH$_2$CH$_2$ | 12 | 12 |
| S-58 | IIIa | CH$_3$O | OCH$_3$ | CH$_2$CH$_2$O | OCH$_2$CH$_2$ | 13 | 13 |
| S-59 | IIIa | CH$_3$O | OCH$_3$ | CH$_2$CH$_2$O | OCH$_2$CH$_2$ | 14 | 14 |
| S-60 | IIIa | CH$_3$O | OCH$_3$ | CH$_2$CH$_2$O | OCH$_2$CH$_2$ | 15 | 15 |
| S-61 | IIIa | CH$_3$O | OCH$_3$ | CH$_2$CH$_2$O | OCH$_2$CH$_2$ | 16 | 16 |
| S-62 | IIIa | CH$_3$O | OCH$_3$ | CH$_2$CH$_2$O | OCH$_2$CH$_2$ | 17 | 17 |
| S-63 | IIIa | CH$_3$O | OCH$_3$ | CH$_2$CH$_2$O | OCH$_2$CH$_2$ | 18 | 18 |
| S-64 | IIIa | CH$_3$O | OCH$_3$ | CH$_2$CH$_2$O | OCH$_2$CH$_2$ | 19 | 19 |
| S-65 | IIIa | CH$_3$O | OCH$_3$ | CH$_2$CH$_2$O | OCH$_2$CH$_2$ | 20 | 20 |
| S-66 | IIIa | CH$_3$O | OCH$_3$ | CH$_2$CH$_2$O | OCH$_2$CH$_2$ | 21 | 21 |
| S-67 | IIIa | CH$_3$O | OCH$_3$ | CH$_2$CH$_2$O | OCH$_2$CH$_2$ | 22 | 22 |
| S-68 | IIIa | CH$_3$O | OCH$_3$ | CH$_2$CH$_2$O | OCH$_2$CH$_2$ | 23 | 23 |
| S-69 | IIIa | CH$_3$O | OCH$_3$ | CH$_2$CH$_2$O | OCH$_2$CH$_2$ | 24 | 24 |
| S-70 | IIIa | CH$_3$O | OCH$_3$ | CH$_2$CH$_2$O | OCH$_2$CH$_2$ | 25 | 25 |
| S-71 | IIIa | CH$_3$O | OC$_2$H$_5$ | CH$_2$CH$_2$O | OCH$_2$CH$_2$ | 3 | 3 |
| S-72 | IIIa | C$_2$H$_5$O | OCH$_3$ | CH$_2$CH$_2$O | OCH$_2$CH$_2$ | 3 | 3 |
| S-73 | IIIa | C$_2$H$_5$O | OC$_2$H$_5$ | CH$_2$CH$_2$O | OCH$_2$CH$_2$ | 3 | 3 |
| S-74 | IIIa | CH$_3$O | OC$_3$H$_7$ | CH$_2$CH$_2$O | OCH$_2$CH$_2$ | 3 | 3 |
| S-75 | IIIa | C$_3$H$_7$O | OCH$_3$ | CH$_2$CH$_2$O | OCH$_2$CH$_2$ | 3 | 3 |
| S-76 | IIIa | C$_2$H$_5$O | OC$_3$H$_7$ | CH$_2$CH$_2$O | OCH$_2$CH$_2$ | 4 | 4 |
| S-77 | IIIa | C$_3$H$_7$O | OC$_2$H$_5$ | CH$_2$CH$_2$O | OCH$_2$CH$_2$ | 4 | 4 |
| S-78 | IIIa | C$_3$H$_7$O | OC$_3$H$_7$ | CH$_2$CH$_2$O | OCH$_2$CH$_2$ | 4 | 4 |
| S-79 | IIIa | CH$_3$O | OC$_4$H$_9$ | CH$_2$CH$_2$O | OCH$_2$CH$_2$ | 4 | 4 |
| S-80 | IIIa | C$_4$H$_9$O | OCH$_3$ | CH$_2$CH$_2$O | OCH$_2$CH$_2$ | 4 | 4 |
| S-81 | IIIa | C$_2$H$_5$O | OC$_4$H$_9$ | CH$_2$CH$_2$O | OCH$_2$CH$_2$ | 5 | 5 |
| S-82 | IIIa | C$_4$H$_9$O | OC$_2$H$_5$ | CH$_2$CH$_2$O | OCH$_2$CH$_2$ | 5 | 5 |
| S-83 | IIIa | C$_3$H$_7$O | OC$_4$H$_9$ | CH$_2$CH$_2$O | OCH$_2$CH$_2$ | 5 | 5 |

TABLE 2-continued $R_{11}-X_{m1}-A-Y_{n1}-R_{12}$

| No. | A | $R_{11}$ | $R_{12}$ | X | Y | m1 | n1 |
|---|---|---|---|---|---|---|---|
| S-84 | IIIa | $C_4H_9O$ | $OC_3H_7$ | $CH_2CH_2O$ | $OCH_2CH_2$ | 5 | 5 |
| S-85 | IIIa | $C_4H_9O$ | $OC_4H_9$ | $CH_2CH_2O$ | $OCH_2CH_2$ | 5 | 5 |
| S-86 | IIIa | $CH_3O$ | $OC_5H_{11}$ | $CH_2CH_2O$ | $OCH_2CH_2$ | 6 | 6 |
| S-87 | IIIa | $C_5H_{11}O$ | $OCH_3$ | $CH_2CH_2O$ | $OCH_2CH_2$ | 6 | 6 |
| S-88 | IIIa | $C_2H_5O$ | $OC_5H_{11}$ | $CH_2CH_2O$ | $OCH_2CH_2$ | 6 | 6 |
| S-89 | IIIa | $C_5H_{11}O$ | $OC_2H_5$ | $CH_2CH_2O$ | $OCH_2CH_2$ | 7 | 7 |
| S-90 | IIIa | $C_3H_7O$ | $OC_5H_{11}$ | $CH_2CH_2O$ | $OCH_2CH_2$ | 7 | 7 |
| S-91 | IIIa | $C_5H_{11}O$ | $OC_3H_7$ | $CH_2CH_2O$ | $OCH_2CH_2$ | 7 | 7 |
| S-92 | IIIa | $C_4H_9O$ | $OC_5H_{11}$ | $CH_2CH_2O$ | $OCH_2CH_2$ | 8 | 8 |
| S-93 | IIIa | $C_5H_{11}O$ | $OC_4H_9$ | $CH_2CH_2O$ | $OCH_2CH_2$ | 8 | 8 |
| S-94 | IIIa | $C_5H_{11}O$ | $OC_5H_{11}$ | $CH_2CH_2O$ | $OCH_2CH_2$ | 8 | 8 |
| S-95 | IIIa | $C_6H_{13}O$ | $OC_6H_{13}$ | $CH_2CH_2O$ | $OCH_2CH_2$ | 3 | 3 |
| S-96 | IIIa | $C_7H_{15}O$ | $OC_7H_{15}$ | $CH_2CH_2O$ | $OCH_2CH_2$ | 4 | 4 |
| S-97 | IIIa | $C_8H_{17}O$ | $OC_8H_{17}$ | $CH_2CH_2O$ | $OCH_2CH_2$ | 5 | 5 |
| S-98 | IIIa | $C_9H_{19}O$ | $OC_9H_{19}$ | $CH_2CH_2O$ | $OCH_2CH_2$ | 6 | 6 |
| S-99 | IIIa | $C_{10}H_{21}O$ | $OC_{10}H_{21}$ | $CH_2CH_2O$ | $OCH_2CH_2$ | 7 | 7 |
| S-100 | IIIa | $C_{11}H_{23}O$ | $OC_{11}H_{23}$ | $CH_2CH_2O$ | $OCH_2CH_2$ | 8 | 8 |
| S-101 | IIIa | $C_{12}H_{25}O$ | $OC_{12}H_{25}$ | $CH_2CH_2O$ | $OCH_2CH_2$ | 3 | 3 |
| S-102 | IIIa | $C_{15}H_{31}O$ | $OC_{15}H_{31}$ | $CH_2CH_2O$ | $OCH_2CH_2$ | 4 | 4 |
| S-103 | IIIa | $C_{24}H_{49}O$ | $OC_{24}H_{49}$ | $CH_2CH_2O$ | $OCH_2CH_2$ | 5 | 5 |
| S-104 | IIIa | $C_{30}H_{61}O$ | $OC_{30}H_{61}$ | $CH_2CH_2O$ | $OCH_2CH_2$ | 6 | 6 |
| S-105 | IIIa | $C_{45}H_{91}O$ | $OC_{45}H_{91}$ | $CH_2CH_2O$ | $OCH_2CH_2$ | 7 | 7 |
| S-106 | IIIa | $C_{70}H_{141}O$ | $OC_{70}H_{141}$ | $CH_2CH_2O$ | $OCH_2CH_2$ | 8 | 8 |
| S-107 | IIIa | $C_{90}H_{181}O$ | $OC_{90}H_{181}$ | $CH_2CH_2O$ | $OCH_2CH_2$ | 3 | 3 |
| S-108 | IIIa | $C_{100}H_{201}O$ | $OC_{100}H_{201}$ | $CH_2CH_2O$ | $OCH_2CH_2$ | 4 | 4 |
| S-109 | IIIa | $CH_3O$ | $OCH_3$ | $CH_2CH(CH_3)O$ | $OCH(CH_3)CH_2$ | 3 | 3 |
| S-110 | IIIa | $CH_3O$ | $OCH_3$ | $CH_2CH_2O$ | $OCH(CH_3)CH_2$ | 3 | 3 |
| S-111 | IIIa | $CH_3O$ | $OCH_3$ | $CH_2CH(CH_3)O$ | $OCH_2CH_2$ | 3 | 3 |
| S-112 | IIIa | $CH_3O$ | $OCH_3$ | $CH_2CH(CH_3)O$ | $OCH(CH_3)CH_2$ | 4 | 4 |
| S-113 | IIIa | $CH_3O$ | $OCH_3$ | $CH_2CH(CH_3)O$ | $OCH(CH_3)CH_2$ | 5 | 5 |
| S-114 | IIIa | $CH_3O$ | $OCH_3$ | $CH_2CH(CH_3)O$ | $OCH(CH_3)CH_2$ | 6 | 6 |
| S-115 | IIIa | $CH_2=CHCOO$ | $OCOCH=CH_2$ | $CH_2CH_2O$ | $OCH_2CH_2$ | 3 | 3 |
| S-116 | IIIa | $CH_2=CHCOO$ | $OCOCH=CH_2$ | $CH_2CH(CH_3)O$ | $OCH(CH_3)CH_2$ | 3 | 3 |
| S-117 | IIIa | $CH_2=CHCOO$ | $OCOCH=CH_2$ | $CH_2CH_2O$ | $OCH_2CH_2$ | 4 | 4 |
| S-118 | IIIa | $CH_2=CHCOO$ | $OCOCH=CH_2$ | $CH_2CH(CH_3)O$ | $OCH(CH_3)CH_2$ | 4 | 4 |
| S-119 | IIIb | $CH_3O$ | $OCOCH=CH_2$ | $CH_2CH_2O$ | $OCH_2CH_2$ | 3 | 3 |
| S-120 | IIIa | $CH\equiv CCOO$ | $OCOC\equiv CH$ | $CH_2CH_2O$ | $OCH_2CH_2$ | 3 | 3 |
| S-121 | IIIa | $CH_2=C(CH_3)COO$ | $OCOC(CH_3)CH_2$ | $CH_2CH_2O$ | $OCH_2CH_2$ | 3 | 3 |
| S-122 | IIIa | $CH_2=CHCO$ | $OCH_3$ | $CH_2CH_2O$ | $OCH_2CH_2$ | 3 | 3 |
| S-123 | IIIa | $C_{10}H_{20}CH\underset{O}{-\!\!\!-\!\!\!-}CH_2O$ | $OCH_2\underset{O}{-\!\!\!-\!\!\!-}CH\!-\!C_{10}H_{20}$ | $CH_2CH_2O$ | $OCH_2CH_2$ | 3 | 3 |
| S-124 | IIIb | $CH_3O$ | $OCH_3$ | $CH_2CH_2O$ | $OCH_2CH_2$ | 3 | 3 |
| S-125 | IIIb | $CH_3O$ | $OCH_3$ | $CH_2CH_2O$ | $OCH_2CH_2$ | 4 | 4 |
| S-126 | IIIb | $CH_3O$ | $OCH_3$ | $CH_2CH_2O$ | $OCH_2CH_2$ | 6 | 6 |
| S-127 | IIIc | $CH_3O$ | $OCH_3$ | $CH_2CH_2O$ | $OCH_2CH_2$ | 3 | 3 |
| S-128 | IIIc | $CH_3O$ | $OCH_3$ | $CH_2CH_2O$ | $OCH_2CH_2$ | 4 | 4 |
| S-129 | IIIc | $CH_3O$ | $OCH_3$ | $CH_2CH_2O$ | $OCH_2CH_2$ | 7 | 7 |
| S-130 | IIId | $CH_3O$ | $OCH_3$ | $CH_2CH_2O$ | $OCH_2CH_2$ | 4 | 4 |
| S-131 | IIId | $CH_3O$ | $OCH_3$ | $CH_2CH_2O$ | $OCH_2CH_2$ | 5 | 5 |
| S-132 | IIId | $CH_3O$ | $OCH_3$ | $CH_2CH_2O$ | $OCH_2CH_2$ | 8 | 8 |
| S-133 | IIIe | $CH_3O$ | $OCH_3$ | $CH_2CH_2O$ | $OCH_2CH_2$ | 4 | 4 |
| S-134 | IIIe | $CH_3O$ | $OCH_3$ | $CH_2CH_2O$ | $OCH_2CH_2$ | 5 | 5 |
| S-135 | IIIe | $CH_3O$ | $OCH_3$ | $CH_2CH_2O$ | $OCH_2CH_2$ | 6 | 6 |
| S-136 | IIIf | $CH_3O$ | $OCH_3$ | $CH_2CH_2O$ | $OCH_2CH_2$ | 3 | 3 |
| S-137 | IIIf | $CH_3O$ | $OCH_3$ | $CH_2CH_2O$ | $OCH_2CH_2$ | 4 | 4 |
| S-138 | IIIf | $CH_3O$ | $OCH_3$ | $CH_2CH_2O$ | $OCH_2CH_2$ | 7 | 7 |
| S-139 | IIIg | $CH_3O$ | $OCH_3$ | $CH_2CH_2O$ | $OCH_2CH_2$ | 4 | 4 |
| S-140 | IIIg | $CH_3O$ | $OCH_3$ | $CH_2CH_2O$ | $OCH_2CH_2$ | 5 | 5 |
| S-141 | IIIg | $CH_3O$ | $OCH_3$ | $CH_2CH_2O$ | $OCH_2CH_2$ | 8 | 8 |
| S-142 | IIIh | $CH_3O$ | $OCH_3$ | $CH_2CH_2O$ | $OCH_2CH_2$ | 3 | 3 |
| S-143 | IIIh | $CH_3O$ | $OCH_3$ | $CH_2CH_2O$ | $OCH_2CH_2$ | 5 | 5 |
| S-144 | IIIh | $CH_3O$ | $OCH_3$ | $CH_2CH_2O$ | $OCH_2CH_2$ | 6 | 6 |
| S-145 | IIIi | $CH_3O$ | $OCH_3$ | $CH_2CH_2O$ | $OCH_2CH_2$ | 3 | 3 |
| S-146 | IIIi | $CH_3O$ | $OCH_3$ | $CH_2CH_2O$ | $OCH_2CH_2$ | 4 | 4 |
| S-147 | IIIi | $CH_3O$ | $OCH_3$ | $CH_2CH_2O$ | $OCH_2CH_2$ | 7 | 7 |
| S-148 | IIIa | HO | OH | $CH_2CH_2O$ | $OCH_2CH_2$ | 3 | 3 |
| S-149 | IIIa | HO | OH | $CH_2CH_2O$ | $OCH_2CH_2$ | 4 | 4 |
| S-150 | IIIa | HO | $OCH_3$ | $CH_2CH_2O$ | $OCH_2CH_2$ | 5 | 5 |

TABLE 2-continued $R_{11}$—$X_{m1}$—A—$Y_{n1}$—$R_{12}$

| No. | A | $R_{11}$ | $R_{12}$ | X | Y | m1 | n1 |
|---|---|---|---|---|---|---|---|
| S-151 | IVa | $CH_3O$ | $OCH_3$ | $CH_2CH_2O$ | $OCH_2CH_2$ | 3 | 3 |
| S-152 | IVa | $CH_3O$ | $OCH_3$ | $CH_2CH_2O$ | $OCH_2CH_2$ | 4 | 4 |
| S-153 | IVb | $CH_3O$ | $OCH_3$ | $CH_2CH_2O$ | $OCH_2CH_2$ | 4 | 4 |

As an example of application of the electrolyte of the present invention, the secondary cell will be described below.

Figure 1:
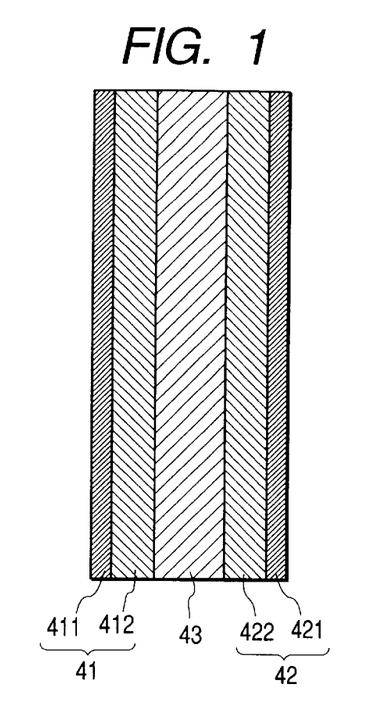
FIG. 1 diagrammatically illustrates the construction of a secondary cell.

FIG. 1 diagrammatically illustrates an example of the construction of the secondary cell. Reference numerals 41 and 42 denote a negative electrode and a positive electrode, respectively. Reference numeral 43 denotes an electrolyte layer. Through this layer, ions having a specific polarity are conducted from the negative electrode to the positive electrode or from the positive electrode to the negative electrode. Usually, these negative and positive electrodes are often in the form of a composite comprised of a plurality of functionally separated members because a variety of functions are required, such as the function to release and absorb ions, the function to communicate with an external device (e.g., electron conduction function) and the function of mechanical support. The negative electrode 41 is formed using a support 411 made of copper, aluminum, gold or platinum, having also the function of electronic connection, and coated thereon with a negative-pole activation substance 412. Alternatively, a negative-pole activation substance having also the function as a support may be used.

Such a negative-pole activation substance may include, as materials having the ability to release alkali ions such as lithium ions, sodium ions and potassium ions, and cations such as alkaline rare earth ions and hydrogen ions, metallic materials such as lithium metal foil and lithium-aluminum alloy; polymeric materials such as polyacetylene, polythiophene, poly-p-phenylene and polyacene, preferably doped in the n-type, and derivatives of these; carbonic materials such as sintered bodies of graphite (plumbago), pitch, coke and organic polymers; and composites of any of these materials with organic polymers; any of which may be used under appropriate selection.

The second electrode 42 is a positive electrode formed using a support 421 made of copper, aluminum, gold or platinum, having also the function of electronic connection, and coated thereon with a positive-pole activation substance 422. Alternatively, a positive-pole activation substance having also the function as a support may be used.

Such a positive-pole activation substance may include inorganic materials such as chalcogen compounds or oxides of transition metals (such as cobalt, vanadium, titanium, molybdenum, iron and manganese), and also composites of any of these with lithium; carbonic materials such as graphite and carbon fluoride as a series of laminar compounds, and composites of any of these materials with organic polymers; and polymeric materials such as polyacetylene, polyaniline, polypyrrole, polythiophene, poly-p-phenylene, polyacene, polyphthalocyanine and polypyridine, preferably doped in the p-type or n-type, and derivatives of these; any of which may be used under appropriate selection.

EXAMPLES

The present invention will be described below in greater detail by giving Examples. The present invention is by no means limited to these Examples.

Synthesis Example 1

Production of 2,3,6,7,10,11-hexa(2-hexyloxyethyloxy) triphenylene (exemplary compound T-6):

(1) Production of 2-hexyloxyethyl p-toluenesulfonate:

Into a reaction vessel, 3.29 g (22.5 mmol) of 2-hexyloxyethanol and 5.33 g (67.5 mmol) of pyridine were charged, and 4.72 g (24.7 mmol) of p-toluenesulfonic acid chloride was added thereto in an ice bath, which were then stirred for 1 hour and thereafter further stirred at room temperature for 3 hours. After the reaction was completed, 3N HCl was added to make the reaction mixture acidic, followed by extraction with toluene twice. The extract obtained was washed with water, and thereafter sodium sulfuric anhydride was added to effect drying. After the solvent was evaporated off, the resultant mixture was purified by silica gel chromatography (eluting solvent: toluene/ ethyl acetate=10/1) to obtain 6.45 g (21.5 mmol) of 2-hexyloxyethyl p-toluenesulfonate. Yield: 95%.

(2) Production of 2,3,6,7,10,11-hexa(2-hexyloxyethyloxy) triphenylene:

Into a reaction vessel, 15 ml of N,N-dimethylformamide (DMF) and 0.77 g (19.3 mmol) of sodium hydroxide (60% in oil) were charged, and 0.92 g (2.84 mmol) of 2,3,6,7,10, 11-hexahydroxytriphenylene was added thereto in an ice bath, which were then stirred for 1 hour. Thereafter, a solution of mixture of 6.3 g (21.0 mmol) of 2-hexyloxyethyl p-toluenesulfonate and 5 ml of DMF was dropwise added, followed by stirring at 80° C. for 5 hours. After the reaction was completed, water was added to make extraction with toluene twice. The extract obtained was washed with water, and thereafter sodium sulfuric anhydride was added to effect drying. After the solvent was evaporated off, the resultant mixture was purified by silica gel chromatography (eluting solvent: toluene/ethyl acetate=5/1) carried out twice, to obtain 1.15 g (1.0 mmol) of 2,3,6,7,10,11-hexa(2-hexyloxyethyloxy)triphenylene. Yield: 35%.

Phase transition temperature measured by DSC (differential scanning calorimetry) on the compound thus obtained is shown below.

Heat-up process: Cry(−24° C.)X1(17° C.)X2(29° C.)Dh(84° C.)Iso

Cooling process: Iso(81° C.)Dh(16° C.)X2(5° C.)X1(<−50° C.)Cry

Cry: crystal phase; X1,X2: phase not identified; Dh: discotic columnar phase; and Iso: isotropic phase.

Example 1

Next, 1 ml of dry dichloromethane was added to 65.6 mg (0.06 mmol) of the 2,3,6,7,10,11-hexa(2-hexyloxyethyloxy) triphenylene thus synthesized, followed by stirring to make it dissolve perfectly. Then, 2.4 mg of polyethylene oxide (average molecular weight: 400), 3.19 mg (0.030 mmol) of lithium perchloride and 1 ml of dry ethanol were added thereto, followed by stirring for 2 hours. After making sure that they dissolved perfectly, the solvent was evaporated off, followed by drying under reduced pressure to obtain an electrolyte A.

Phase transition temperature of the electrolyte A thus obtained is shown below.

Heat-up process: Cry(<−50° C.)X1(22° C.)X2(29° C.)Dh(88° C.)Iso

Cooling process:
Iso(86° C.)Dh(10° C.)X2(<−50° C.)X1(<−50° C.)Cry

Cry: crystal phase; X1,X2: phase not identified; Dh: discotic columnar phase; and Iso: isotropic phase.

Example 2

1 ml of dry dichloromethane was added to 65.6 mg (0.06 mmol) of the 2,3,6,7,10,11-hexa(2-hexyloxyethyloxy)triphenylene, followed by stirring to make it dissolve perfectly. Then, 4.8 mg of polyethylene oxide (average molecular weight: 3,000), 3.19 mg (0.030 mmol) of lithium perchloride and 1 ml of dry ethanol were added thereto, followed by stirring for 2 hours. After making sure that they dissolved perfectly, the solvent was evaporated off, followed by drying under reduced pressure to obtain an electrolyte B.

Phase transition temperature of the electrolyte B thus obtained is shown below.

Heat-up process: Cry(<−50° C.)X1(28° C.)X2(31° C.)Dh(90° C.)Iso

Cooling process:
Iso(88° C.)Dh(11C)X2(<−50° C.)X1(<−50° C.)Cry

Cry: crystal phase; X1,X2: phase not identified; Dh: discotic columnar phase; and Iso: isotropic phase.

Example 3

A pair of glass substrates of 1.1 mm thick were prepared on which 700 Å ITO films were formed as transparent electrodes. On the transparent electrode on one substrate of the substrates, silica beads of 2.4 μm in average particle diameter were sprayed as a spacer to produce a cell A having a uniform cell gap.

Into this cell, the electrolyte A prepared in Example 1 was injected in the state of an isotropic liquid, and the isotropic-phase electrolyte was cooled at a rate of 20° C./h to a temperature at which it came to show the discotic columnar phase. The resultant cell was put on a polarized-light microscope to observe its texture under crossed Nicols. As a result, a dark visual filed was recognized, and the discotic columnar phase was found to stand in homeotropic orientation. Next, electric current flowing when an AC voltage of 0.001 to 100 kHz and 10 mV was applied was measured to measure complex impedance, and the ion conductivity was calculated. Results obtained are shown below.

| Measurement temperature | Ion conductivity |
| --- | --- |
| 50° C. | $1.1 \times 10^{-7}$ S/cm |

Next, a cell B was produced in the same manner as the above except that the silica beads of 2.4 μm in average particle diameter were replaced with silica beads of 20 μm in average particle diameter. The electrolyte A was injected and the texture was observed on a polarized-light microscope in the same way. As a result, multidomain orientation was observable, and the discotic columnar phase was found to stand in random orientation. The complex impedance was also measured in the same manner, and the ion conductivity was calculated. Results obtained are shown below.

| Measurement temperature | Ion conductivity |
| --- | --- |
| 50° C. | $3.6 \times 10^{-9}$ S/cm |

Example 4

Two kinds of cells were produced in the same manner as in Examples 3 and 4 except that the electrolyte A was replaced with the electrolyte B. These electrolytes were each injected and the texture was observed on a polarized-light microscope in the same way. As a result, in the cell A, produced using the silica beads of 2.4 μm, a dark visual filed was recognized, and the discotic columnar phase was found to stand in homeotropic orientation. In the cell B, produced using the silica beads of 20 μm, multidomain orientation was observable, and the discotic columnar phase was found to stand in random orientation. For each cell, the complex impedance was measured in the same manner as in Example 3, and the ion conductivity was calculated. Results obtained are shown below.

Cell using 2.4 μm silica beads:

| Measurement temperature | Ion conductivity |
| --- | --- |
| 50° C. | $9.4 \times 10^{-8}$ S/cm |

Cell using 20 μm silica beads:

| Measurement temperature | Ion conductivity |
| --- | --- |
| 50° C. | $8.8 \times 10^{-9}$ S/cm |

Comparative Example 1

(1) Production of Electrolyte C:

1 ml of dry dichloromethane was added to 65.6 mg (0.06 mmol) of 2,3,6,7,10,11-hexa(2-hexyloxyethyloxy)triphenylene, followed by stirring to make it dissolve perfectly. Then, 0.64 mg (0.006 mmol) of lithium perchloride and 1 ml of dry ethanol were added thereto, followed by stirring for 2 hours. After making sure that they dissolved perfectly, the solvent was evaporated off, followed by drying under reduced pressure to obtain an electrolyte C.

Its phase transition temperature is shown below.

Heat-up process: Cry(−3° C.)X1(19° C.)X2(27° C.)Dh(86° C.)Iso

Cooling process:
Iso(84° C.)Dh(7° C.)X2(<−18° C.)X1(<−50° C.)Cry

Cry: crystal phase; X1,X2: phase not identified; Dh: discotic columnar phase; and Iso: isotropic phase.

(2) Evaluation of Ion Conductivity of Electrolyte C:

Two kinds of cells were produced in the same manner as in Examples 3 and 4 except that the electrolyte A was replaced with the electrolyte C. These electrolytes were each injected and the texture was observed on a polarized-light microscope in the same way. As a result, in the cell A, produced using the silica beads of 2.4 μm, a dark visual filed was recognized, and the discotic columnar phase was found to stand in homeotropic orientation. In the cell B, produced using the silica beads of 20 μm, multidomain orientation was observable, and the discotic columnar phase was found to stand in random orientation. For each cell, the complex impedance was measured in the same manner as in Example 3, and the ion conductivity was calculated. Results obtained are shown below.

Cell using 2.4 μm silica beads:

| Measurement temperature | Ion conductivity |
|---|---|
| 50° C. | $2.4 \times 10^{-9}$ S/cm |

Cell using 20 μm silica beads:

| Measurement temperature | Ion conductivity |
|---|---|
| 50° C. | $1.8 \times 10^{-10}$ S/cm |

Synthesis Example 2

Production of exemplary compound S-11:

(1) Production of Methyloxytri(ethyleneoxy)ethyl Oxytosilate:

Into a 100 ml egg-plant type flask, 20 g (96 mmol) of tetraethylene glycol monomethyl ether and 20 ml of pyridine were charged, and were cooled to 0° C. in an ice bath. Then, 23.8 g (125 mmol) of p-toluenesulfonic acid chloride was slowly added thereto, followed by stirring at 0° C. for 12 hours. Water was added to make extraction with chloroform. The organic layer formed was dried with sodium sulfuric anhydride, and thereafter the solvent was evaporated off, followed by separation and purification by silica gel chromatography (chloroform/methanol=100/1) to obtain 34.5 g (95.2 mmol) of methyloxytri(ethyleneoxy)ethyl oxytosilate. Yield: 99%.

(2) Production of 4'-[methyloxytri(ethyleneoxy)ethyloxy]-4-biphenylcarboxylic Acid:

Into a 500 ml egg-plant type flask, 5 g (23 mmol) of 4'-hydroxy-4-biphenylcarboxylic acid, 3.3 g of potassium hydroxide and 400 ml of methanol were charged, and were refluxed with heating for 1 hour. Then, 8.5 g (23 mmol) of methyloxytri(ethyleneoxy)ethyl oxytosilate was added thereto, followed by refluxing with heating for further 24 hours. The resultant reaction solution was cooled to room temperature, and was neutralized with 1N hydrochloric acid, followed by addition of water to make extraction with chloroform. The organic layer formed was dried with sodium sulfuric anhydride, and thereafter the solvent was evaporated off, followed by separation and purification by silica gel chromatography (chloroform/methanol=30/1) to obtain 3.8 g (9.4 mmol) of a white solid 4'-[methyloxytri(ethyleneoxy)ethyloxy]-4-biphenylcarboxylic acid. Yield: 40%.

(3) Production of 4'-[methyloxytri(ethyleneoxy)ethyloxy]-4-hydroxybiphenyl:

Into a 500 ml egg-plant type flask, 2.6 g (14 mmol) of 4,4'-biphenol, 1.8 g of potassium hydroxide and 250 ml of methanol were charged, and were refluxed with heating for 1 hour. Then, 5.1 g (14 mmol) of methyloxytri(ethyleneoxy) ethyl oxytosilate was added, followed by refluxing with heating for further 24 hours. The resultant reaction solution was cooled to room temperature, and was neutralized with 1N hydrochloric acid, followed by addition of water to make extraction with chloroform. The organic layer formed was dried with sodium sulfuric anhydride, and thereafter the solvent was evaporated off, followed by separation and purification by silica gel chromatography (chloroform/methanol=50/1) to obtain 11.8 g (4.7 mmol) of a white solid 4'-[methyloxytri(ethyleneoxy)ethyloxy]-4-hydroxybiphenyl. Yield: 33.6%.

(4) Production of 4-[methyloxytri(ethyleneoxy)ethyloxy]-4'-biphenyl 4'-[methyloxytri(ethyleneoxy)ethyloxy]-4-biphenylcarboxylate (Exemplary Compound S-11):

Into a 100 ml egg-plant type flask, 2 g (5.0 mmol) of 4'-[methyloxytri(ethyleneoxy)ethyloxy]-4-biphenylcarboxylic acid, 1.9 g (5.0 mmol) of 4'-[methyloxydi(ethyleneoxy)ethyloxy]-4-hydroxybiphenyl, 0.8 g (10 mmol) of 1,3-dicyclocarbodiimide, 0.6 g (5 mmol) of 4-dimethylaminopyridine and 20 ml of dry chloroform were charged, and were stirred at room temperature for 24 hours. After the reaction was completed, water was added to make extraction with chloroform. The organic layer formed was dried with sodium sulfuric anhydride, and thereafter the solvent was evaporated off, followed by separation and purification by silica gel chromatography (chloroform/methanol=30/1) and thereafter recrystallization (acetone) to obtain 2.9 g (3.8 mmol) of a white solid 4-[methyloxytri(ethyleneoxy)ethyloxy]-4'-biphenyl 4'-[methyloxytri(ethyleneoxy)ethyloxy]-4-biphenylcarboxylate. Yield: 75.2%.

$^1$H-NMR (CDCl 3/TMS, σ ppm): 3.4(6H, s), 3.6–4.2 (32H, m), 7.0(4H, m), 7.3(2H, d), 7.5–7.7(8H, m), 8.2(2H, d).

Its phase transition temperature is shown below.

Heat-up process:
Cry(51° C.)SmX(104° C.)SmC(154° C.)N(173° C.)Iso
Cooling process:
Iso(170° C.)N(150° C.)SmC(99° C.)SmX(9° C.)Cry Cry: crystal phase; SmX: high-dimensional smectic phase; SmC: smectic C phase; N: nematic phase; and Iso: isotropic phase.

Comparative Example 2

(1) Production of Electrolyte D:

4 ml of dry chloroform was added to 50 mg (0.066 mmol) of the exemplary compound S-11, followed by stirring to make it dissolve perfectly. Then, 1 ml of a THF (tetrahydrofuran) solution in which 4.09 mg (0.026 mmol) of lithium trifluoromethanesulfonate was dissolved was added thereto, followed by stirring for 2 hours. The solvent was slowly evaporated off under reduced pressure, followed by drying under reduced pressure to obtain an electrolyte D.

Its phase transition temperature is shown below.

Heat-up process:
SmX(94° C.)SmC(151° C.)SmA(165° C.)N(171° C.)Iso
Cooling process:
Iso(169° C.)N(164° C.)SmA(151° C.)SmC(89° C.)SmX SmX: high-dimensional smectic phase; SmA: smectic A phase; SmC: smectic C phase; N: nematic phase; and Iso: isotropic phase.

Figure 2:
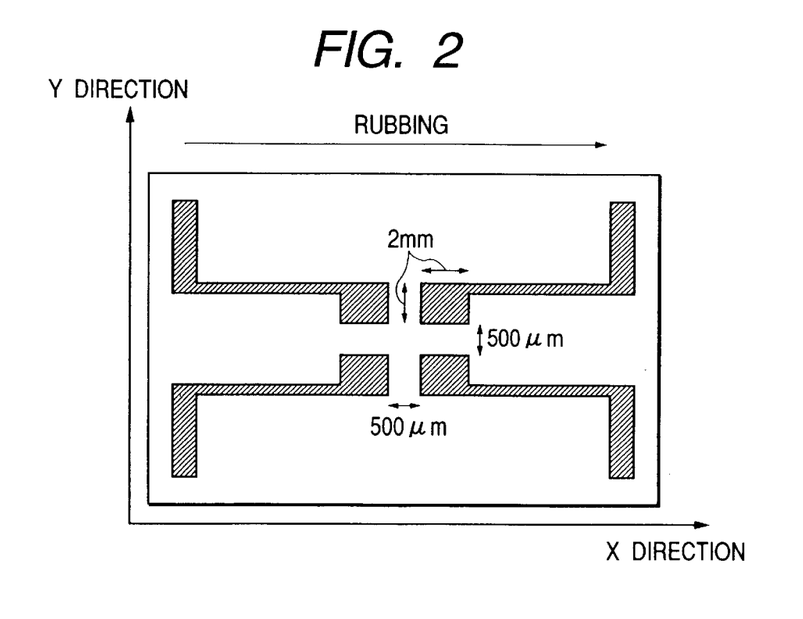
FIG. 2 is a pattern diagram of a cell C.

(2) Evaluation of Ion Conductivity of Electrolyte D:

Two glass sheets were prepared, and a gold film was formed on one glass sheet in a thickness of 400 Å, which was then etched in the pattern shown in FIG. 2. On each glass sheet, a solution of dimethylacetamide solution of 1.5% of a polyimide resin precursor (SP-710, available from Toray Industries, Ltd.) was coated for 15 seconds by means of a spin coater at a number of revolutions of 2,000 r.p.m. After coating films were formed, they were subjected to heat condensation baking treatment at 300° C. for 60 minutes. At this stage, the coating films were each in a layer thickness of about 250 Å. Rubbing treatment with an acetate hair-set cloth was made on the films having been thus baked, which were thereafter washed with isopropyl alcohol, and, on one of the glass sheets thus treated, silica beads of 2.0 μm were sprayed. Thereafter, the respective rubbing treatment axes were so made as to be in parallel, and the glass sheets were bonded with an adhesive sealer (STRUCT BOND, trade name; available from Mitsui Toatsu Chemicals, Inc.), followed by heating and drying at 170° C. for 60 minutes to produce a cell C.

Into this cell C, the electrolyte D was injected in the state of an isotropic liquid, and the isotropic-phase electrolyte was cooled at a rate of 3° C./min to a temperature at which it came to show the smectic A phase. The resultant cell was put on a polarized-light microscope to observe its texture under crossed Nicols. As a result, homogeneous uniform orientation of the smectic A phase was observable. Next, electric current flowing when an AC voltage of 0.001 to 100 kHz and 3,000 mV was applied was measured to measure complex impedance, and the ion conductivity was calculated. Results obtained are shown below.

X-direction:

| Measurement temperature | Ion conductivity |
|---|---|
| 40° C. | $5.2 \times 10^{-7}$ S/cm |
| 80° C. | $2.0 \times 10^{-6}$ S/cm |

Y-direction:

| Measurement temperature | Ion conductivity |
|---|---|
| 40° C. | $3.2 \times 10^{-5}$ S/cm |
| 80° C. | $1.2 \times 10^{-4}$ S/cm |

Comparative Example 3

(1) Production of Electrolyte E:

5.0 mg of polyethylene oxide (average molecular weight: 400), 0.88 mg (0.056 mmol) of lithium trifluoromethanesulfonate and 1 ml of dry THF were added, and then stirred for 2 hours. After making sure that they dissolved perfectly, the solvent was evaporated off, followed by drying under reduced pressure to obtain an electrolyte E.

(2) Evaluation of Ion Conductivity of Electrolyte E:

A cell C was produced in the same manner as in Comparative Example 2. The electrolyte was injected into this cell in the same manner as in Comparative Example 2 except that the electrolyte D was replaced with the electrolyte E. The ion conductivity was calculated in the same way. Results obtained are shown below.

X-direction:

| Measurement temperature | Ion conductivity |
|---|---|
| 40° C. | $6.9 \times 10^{-4}$ S/cm |
| 80° C. | $3.2 \times 10^{-3}$ S/cm |

Y-direction:

| Measurement temperature | Ion conductivity |
|---|---|
| 40° C. | $7.0 \times 10^{-4}$ S/cm |
| 80° C. | $3.4 \times 10^{-3}$ S/cm |

Example 5

(1) Production of Electrolyte F:

1 ml of dry dichloromethane was added to 37.0 mg (0.05 mmol) of the exemplary compound S-11 synthesized, followed by stirring to make it dissolve perfectly. Then, 3.4 mg of polyethylene oxide (average molecular weight: 400), 3.6 mg (0.023 mmol) of lithium trifluoromethanesulfonate and 1 ml of dry THF were added thereto, followed by stirring for 2 hours. After making sure that they dissolved perfectly, the solvent was evaporated off, followed by drying under reduced pressure to obtain an electrolyte F.

Phase transition temperature of the electrolyte F is shown below.

Heat-up process:
SmX(80° C.)SmC(110° C.)SmA(132° C.)N(146° C.)Iso

Cooling process:
Iso(145° C.)N(135° C.)SmA(116° C.)SmC(90° C.)SmX

SmX: high-dimensional smectic phase; SmA: smectic A phase; SmC: smectic C phase; N: nematic phase; and Iso: isotropic phase.

(2) Evaluation of Ion Conductivity of Electrolyte F:

A cell C was produced in the same manner as in Comparative Example 2. The electrolyte was injected into this cell in the same manner as in Comparative Example 2 except that the electrolyte D was replaced with the electrolyte F. The ion conductivity was calculated in the same way. Results obtained are shown below.

X-direction:

| Measurement temperature | Ion conductivity |
|---|---|
| 40° C. | $6.9 \times 10^{-6}$ S/cm |
| 80° C. | $5.3 \times 10^{-5}$ S/cm |

Y-direction:

| Measurement temperature | Ion conductivity |
|---|---|
| 40° C. | $8.5 \times 10^{-4}$ S/cm |
| 80° C. | $1.0 \times 10^{-3}$ S/cm |

Example 6

(1) Production of Electrolyte G:

1 ml of dry dichloromethane was added to 37.0 mg (0.05 mmol) of the exemplary compound S-11 synthesized, followed by stirring to make it dissolve perfectly. Then, 10.2 mg of polyethylene oxide (average molecular weight: 400), 4.8 mg (0.031 mmol) of lithium trifluoromethanesulfonate and 2 ml of dry THF were added thereto, followed by stirring for 2 hours. After making sure that they dissolved perfectly, the solvent was evaporated off, followed by drying under reduced pressure to obtain an electrolyte G.

Phase transition temperature of the electrolyte G is shown below.

Heat-up process: X3(90° C.)N(124° C.)Iso
Cooling process: Iso(120° C.)N(87° C.)X3
X3: high-dimensional phase not identified; N: nematic phase; and Iso: isotropic phase.

(2) Evaluation of Ion Conductivity of Electrolyte G:

A cell C was produced in the same manner as in Comparative Example 2. The electrolyte was injected into this cell in the same manner as in Comparative Example 2 except that the electrolyte D was replaced with the electrolyte G. The ion conductivity was calculated in the same way. Results obtained are shown below.

X-direction:

| Measurement temperature | Ion conductivity |
|---|---|
| 40° C. | $8.9 \times 10^{-6}$ S/cm |
| 80° C. | $8.0 \times 10^{-5}$ S/cm |

Y-direction:

| Measurement temperature | Ion conductivity |
|---|---|
| 40° C. | $7.7 \times 10^{-3}$ S/cm |
| 80° C. | $3.0 \times 10^{-3}$ S/cm |

What is claimed is:

1. An electrolyte comprising a liquid-crystal compound, a straight-chain or branched polyether compound and a metal salt,
   wherein the liquid-crystal compound is orientated to provide ion conductivity of the electrolyte with anisotropy, and
   wherein the liquid-crystal compound is represented by the formula with $R_1$ to $R_6$ each independently representing a side chain which is comprised of at least two $OCH_2CH_2$ segments or two $OCH_2CH_2CH_2$ segments and to the terminal of which a straight-chain or branched alkyl group has been attached.

2. The electrolyte according to claim 1, which contains an organic solvent.

3. A secondary cell comprising the electrolyte according to claim 1.

4. The electrolyte according to claim 1, wherein the liquid-crystal compound has been made polymeric by polymerization reaction.

5. The electrolyte according to claim 1, wherein the metal salt is an alkali metal salt.

6. An electrolyte comprising a liquid-crystal compound, a straight-chain or branched polyether compound and a metal salt,
   wherein the liquid-crystal compound is orientated to provide ion conductivity of the electrolyte with anisotropy, and the liquid-crystal compound is represented by the formula:

where A represents $A_1\text{-}B_1\text{-}A_2\text{-}B_2\text{-}A_3\text{-}B_3\text{-}A_4\text{-}B_4\text{-}A_5\text{-}B_5\text{-}A_6$ with $A_1$ to $A_6$ each independently representing 1,4-phenylene or 1,4-cyclohexylene;

with $B_1$ to $B_5$ each independently representing $CH_2O$, $OCH_2$, COO or OOC;

with X representing $CH_2CH_2O$ or $CHCH_3CH_2O$;

with Y representing $OCH_2CH_2$ or $OCH_2CHCH_3$; with $R_{11}$ and $R_{12}$ each independently representing a straight-chain or branched alkyl group having 1 to 100 carbon atoms; and with m and n each independently representing an integer from 3 to 25.

7. A secondary cell comprising the electrolyte according to claim 6.

8. The electrolyte according to claim 6, which contains an organic solvent.

9. The electrolyte according to claim 6, wherein the liquid-crystal compound has been made polymeric by polymerization reaction.

10. The electrolyte according to claim 6, wherein the metal salt is an alkali metal salt.

* * * * *

UNITED STATES PATENT AND TRADEMARK OFFICE
CERTIFICATE OF CORRECTION

PATENT NO.     : 6,692,658 B2                                       Page 1 of 2
DATED          : February 17, 2004
INVENTOR(S)    : Shinichi Nakamura et al.

It is certified that error appears in the above-identified patent and that said Letters Patent is
hereby corrected as shown below:

Title page,
Item [56], References Cited, OTHER PUBLICATIONS, under "M. Watanabe, et al.,"
reference, "Estimation Li+ Transport Nubmer" should read --Estimation of Li+
Transport Number --; and under "C. Piechocki, et al.," reference,
"Metallophthalocynines." should read -- Metallophthalocyanines --.

Column 1,
Line 25, "dissociated." should read -- that are dissociated. --.

Column 2,
Line 11, "make" should read -- made --.
Line 50, "make" should read -- makes --.

Column 3,
Line 13, "not" should read -- is not --.
Line 52, "combination" should read -- combinations --.

Column 4,
Line 50, "Λ3-B3-Λ4-B4-Λ5-B5-Λ6. Al, Λ2 and Λ3" should read
-- A3-B3-A4-B4-A5-B5-A6. Al, A2 and A3 --.
Line 52, "Λ4, Λ5 and Λ6" should read -- A4, A5 and A6 --.

Column 8,
Table 1-continued, "T-18  O(CII$_2$CII$_2$O)$_2$C$_8$II$_{17}$" should read
-- T-18  O(CH$_2$CH$_2$O)$_2$C$_8$H$_{17}$ --.
Table 1-continued, "T-20  O(CII$_2$CII$_2$O)$_2$C$_{10}$II$_{21}$" should read
-- T-20  O(CH$_2$CH$_2$O)$_2$C$_{10}$H$_{21}$ --.
Table 2, "S-6 IIIa CII$_3$O OCII$_3$ CII$_2$CII$_2$O OCII$_2$CII$_2$  3  8" should read
-- S-6 IIIa CH$_3$O OCH$_3$ CH$_2$CH$_2$O OCH$_2$CH$_2$  3  8 --.

Column 9,
Table 2-continued, "S-17 IIIa CII$_3$O OCII$_3$ CII$_2$CII$_2$O OCII$_2$CII$_2$ 4 17" should read
-- S-17 IIIa CH$_3$O OCH$_3$ CH$_2$CH$_2$O OCH$_2$CH$_2$ 4 17 --.
Table 2-continued, "S-19 IIIa CII$_3$O OCII$_3$ CII$_2$CII$_2$O OCII$_2$CII$_2$ 5 3" should read
-- S-19 IIIa CH$_3$O OCH$_3$ CH$_2$CH$_2$O 5 3 --.
Table 2-continued, "S-37 IIIa CII$_3$O OCII$_3$ CII$_2$CII$_2$O OCII$_2$CII$_2$ 7 3" should read
-- S-37 IIIa CH$_3$O OCH$_3$ CH$_2$CH$_2$O OCH$_2$CH$_2$ 7 3 --.
Table 2-continued, "S-56 IIIa CII$_3$O OCII$_3$ CII$_2$CII$_2$O OCII$_2$CII$_2$ 11 11" should read
-- S-56 IIIa CH$_3$O OCH$_3$ CH$_2$CH$_2$O OCH$_2$CH$_2$ 11 11 --.
Table 2-continued, "S-75 IIIa C$_3$II$_7$O OCII$_3$ CII$_2$CII$_2$O OCII$_2$CII$_2$ 3 3" should read
-- S-75 IIIa C$_3$H$_7$O OCH$_3$ CH$_2$CH$_2$O OCH$_2$CH$_2$ 3 3 --.
Table 2-continued, "S-77 IIIa C$_3$II$_7$O OC$_2$II$_5$ CII$_2$CII$_2$O OCII$_2$CII$_2$ 4 4" should read
-- S-77 IIIa C$_3$H$_7$O OC$_2$H$_5$ CH$_2$CH$_2$O OCH$_2$CH$_2$ 4 4 --.

UNITED STATES PATENT AND TRADEMARK OFFICE
CERTIFICATE OF CORRECTION

PATENT NO. : 6,692,658 B2
DATED : February 17, 2004
INVENTOR(S) : Shinichi Nakamura et al.

It is certified that error appears in the above-identified patent and that said Letters Patent is hereby corrected as shown below:

Column 11,
Table 2-continued, "S-98  IIIa  $C_9H_{19}O$  $OC_9H_{19}$  $CH_2CH_2O$  $OCH_2CH_2$  6 6"
should read -- S-98  IIIa  $C_9H_{19}O$  $OC_9H_{19}$  $CH_2CH_2O$  $OCH_2CH_2$  6 6 --.
Table 2-continued, "S-113  IIIa  $CH_3O$  $OCH_3$  $CH_2CH(CH_3)O$  $OCH(CH_3)CH_2$  5 5"
should read -- S-113  IIIa  $CH_3O$  $OCH_3$  $CH_2CH(CH_3)O$  $OCH(CH_3)CH_2$  5 5 --.
Table 2-continued, "S-120  IIIa  $CH\equiv CCOO$  $OCOC\equiv CH$  $CH_2CH_2O$  $OCH_2CH_2$  3 3"
should read -- S-120  IIIa  $CH\equiv CCOO$  $OCOC\equiv H$  $CH_2CH_2O$  $OCH_2CH_2$  3 3 --.
Table 2-continued, "S-124  IIIb  $CH_3O$  $OCH_3$  $CH_2CH_2O$  $OCH_2CH_2$  3 3"
should read -- S-124  IIIb  $CH_3O$  $OCH_3$  $CH_2CH_2O$  $OCH_2CH_2$  3 3 --.
Table 2-continued, "S-147  IIIi  $CH_3O$  $OCH_3$  $CH_2CH_2O$  $OCH_2CH_2$  7 7"
should read -- S-147  IIIi  $CH_3O$  $OCH_3$  $CH_2CH_2O$  $OCH_2CH_2$  7 7 --.

Column 15,
Line 45, "filed" should read -- field --.

Column 16,
Line 5, "3.6 x $10^9$ S/cm" should read -- 3.6 x $10^{-9}$ S/cm --.
Line 15, "filed" should read -- field --.
Line 59, "electrolyte $\Lambda$" should read -- electrolyte A --.
Line 63, "filed" should read -- field --.

Column 18,
Line 2, "11.8 g" should read -- 1.8 g --.
Line 3, "hydroxybipheny" should read -- hydroxybiphenyl. --
Line 4, delete "11.".
Line 26, "(32II, m), 7.0(4II, m), 7.3(2II, d), 7.5-7.7(8II, m), 8.2(2II," should read -- (32H, m), 7.0(4H, m), 7.3(2H, d), 7.5-7.7(8H, m), 8.2(2H, --.

Signed and Sealed this

Twenty-first Day of June, 2005

JON W. DUDAS
*Director of the United States Patent and Trademark Office*